US006102444A

United States Patent [19]

Kozey

[11] Patent Number: 6,102,444
[45] Date of Patent: Aug. 15, 2000

[54] STORZ TYPE COUPLING

[75] Inventor: Gregory Kozey, Eastford, Conn.

[73] Assignee: Kochek Company, Inc., Eastford, Conn.

[21] Appl. No.: 09/112,729

[22] Filed: Jul. 9, 1998

[51] Int. Cl.[7] .......... B60D 1/62

[52] U.S. Cl. .......... 285/79; 285/376

[58] Field of Search .......... 285/73, 79, 336, 285/360, 362, 376, 379, 401

[56] References Cited

U.S. PATENT DOCUMENTS

| | | | |
|---|---|---|---|
| 489,107 | 1/1893 | Storz | 285/73 |
| 2,525,652 | 10/1950 | Cunningham | 285/336 X |
| 4,402,531 | 9/1983 | Kennedy, Jr. | 285/360 X |
| 4,602,654 | 7/1986 | Stehling et al. | 285/401 X |
| 5,184,851 | 2/1993 | Sparling et al. | 285/79 |
| 5,301,985 | 4/1994 | Terzini | 285/376 X |
| 5,979,910 | 11/1999 | Shinohara et al. | 285/379 X |

FOREIGN PATENT DOCUMENTS

| | | | |
|---|---|---|---|
| 22578 | 9/1900 | Switzerland | 285/73 |
| 1686245 | 10/1991 | U.S.S.R. | 285/73 |

OTHER PUBLICATIONS

Higgins, Raymond, The Properties of Engineering Materials, 2nd ed., Indsutrial Press, New York, p. 261, May 1995.
Oberg et al, Machinery's Handbook, 25th ed., Industrial Press, New York, pp. 2378 & 2382, 1996.
Shigley et al, Mechanical Engineering Design, 4th ed., McGraw Hill, New York, p. 399, 1983.

*Primary Examiner*—Lynne H. Browne
*Assistant Examiner*—Greg Binda
*Attorney, Agent, or Firm*—McCormick, Paulding & Huber LLP

[57] ABSTRACT

A multi-part STORZ type coupling comprises a pair of similar and complementary coupling units. Each unit comprises assembled inner and outer annular parts which are threaded together and fixedly attached. Each inner annular part has a pair of similar spaced forwardly projecting lugs at a front-end portion and each lug has a radially outwardly projecting ear at its free end portion. Each outer annular part has a diametrically enlarged front-end portion which accommodates an annular groove opening radially inwardly. Circumaxially spaced forwardly open notches permit the lugs of a complementary coupling unit to be entered rearwardly through the notches into the groove. When the lugs have been so entered and rotated to an assembled position the parts of the coupling may be fixedly attached to each other.

25 Claims, 7 Drawing Sheets

STORZ TYPE COUPLING

TECHNICAL FIELD

The present invention relates to couplings of the type used in attaching and detaching hoses and other devices carrying fluid or other media. More particularly, the invention relates to coupling's of the STORZ type which are adapted for quick connect and disconnect operation and which are widely used in fire fighting as for example in connecting fire hoses to fire hydrants, pumps and other hoses.

BACKGROUND OF THE INVENTION

Couplings of the STORZ type have heretofore been available in a unitary or one piece construction and have been widely accepted. Due at least in part, however, to their unitary construction, the couplings have been relatively expensive to manufacture and have also been found lacking in some degree with regard to performance under high pressure.

It is a general object of the present invention to provide an improved coupling of the STORZ type in a multi-part construction which can be readily manufactured at economic advantage and which is yet capable of superior performance in the field.

SUMMARY OF THE PRESENT INVENTION

In fulfillment of the foregoing object and in accordance with the present invention, a coupling of the STORZ type comprises a pair of similar and complementary coupling units, each of which comprises assembled inner and outer annular parts. The inner annular part is threaded externally over an axially extending portion thereof and the outer annular part has mating internal threads over an axially extending portion thereof. With the inner and outer parts threadedly engaged at their mating portions, the parts are assembled and preferably fixedly attached together to form a coupling unit. Attachment may be provided for by a set screw arrangement, or adhesive attachment, etc.

Each inner annular part of a coupling unit has front and rear-end portions with a pair of circumaxially spaced axially forwardly projecting lugs at its front end portion and each lug has a radially outwardly projecting ear at its free-end portion.

Each outer annular part, has a front-end portion adjacent and diametrically enlarged relative to its threaded portion and relative also to the front-end portion of an associated inner part, when the parts are assembled as aforesaid. A radially inwardly and axially forwardly open, generally L-shaped annular groove is defined in said diametrically enlarged portion. Further, the front-end portion of said outer annular part also defines a pair of similar circumaxially spaced axially forwardly open notches communicating with the annular groove and located and dimensioned for the rearward axial entry of the lugs on a complementary coupling unit. That is, the notches receive and accommodate movement of the lugs therethrough into the annular groove communicating with the notches. Relative rotation of the two coupling units on entry of the lugs and their ears into the annular grooves serves to secure the units together in assembled relationship for the flow of a fluid therethrough.

In one version of the coupling, the inner annular part of at least one of the coupling units includes an annular substantially flat and radially extending forwardly exposed sealing surface located at its front end portion and disposed radially inwardly of the lugs provided thereon. Another version of the coupling has defined in a similar flat surface a shallow forwardly exposed annular groove, the latter accommodating an annular seal in operation of the coupling.

Another feature of the coupling resides in the provision of a small radial flange on at least one lug on at least one inner annular part. The flange is located adjacent to the rear-end portion of the lug and disposed in the generally L-shaped groove when the inner and outer parts of the coupling unit are assembled. Thus, the flange can serve as a positive stop when engaged by a lug on a complementary coupling unit during relative rotation of the two coupling units as aforesaid.

As mentioned, the inner and outer annular parts of a coupling unit are preferably secured against relative rotation when the parts are assembled. A pin or set screw may be provided for cooperation with a small threaded radial opening in at least one of said inner and outer parts. Alternatively, the parts may be adhesively bonded together when assembled.

Another feature of the improved coupling resides in the provision of an optional latching device which is operable to allow a lug ear to rotate through an associated L-shaped groove in one direction on assembly of two complementary coupling units, but which engages and prevents rotation of the lug ear along the groove in an opposite direction to prevent unintended disassembly of the units. The latching device is also operable manually to allow free passage of the lug in the said opposite direction for the intentional disassembly of units.

Various configurations of coupling parts include a rear-end portion of an inner annular part with an internally threaded annular female connecting portion, an externally threaded annular male connecting portion, a swivel connecting portion with an annular groove accommodating ball bearings or the like, and a closure for the through opening in an inner annular part.

Still further, the improved multi-part coupling of the present invention may be readily manufactured employing conventional machining operations from aluminum alloyed, brass, stainless steel and other materials. Cast aluminum alloy construction is also readily accommodated as is a molded thermoplastic mode of construction.

In a method of manufacture readily accommodated with the multi-part construction of the present invention, a first plurality of coupling parts may be provided with an integrally threaded portion and a front-end portion defining a radially inwardly and axially forwardly open generally L-shaped annular groove. A second plurality of inner annular parts each having an externally threaded portion on front and rear end portions with a pair of similar circumaxially spaced axially forwardly projecting lugs, each lug with a radially outwardly projecting ear at its free end portion. A number of groups of said inner annular parts within said plurality of parts may be provided respectively with male, female, swivel, closure and other types of rear-end portions. Thus, an annular part from the first plurality of parts may be selected and assembled with an inner annular part from a desired group of parts within the second plurality of parts. A substantial savings in the inventory of parts can thus be accomplished.

BRIEF DESCRIPTION OF THE DRAWINGS

FIG. 7 a view similar to FIG. 6 but showing high pressure upper and lower coupling units for connection with a fire hydrant or the like.

DESCRIPTION OF PREFERRED EMBODIMENTS

Figure 1:
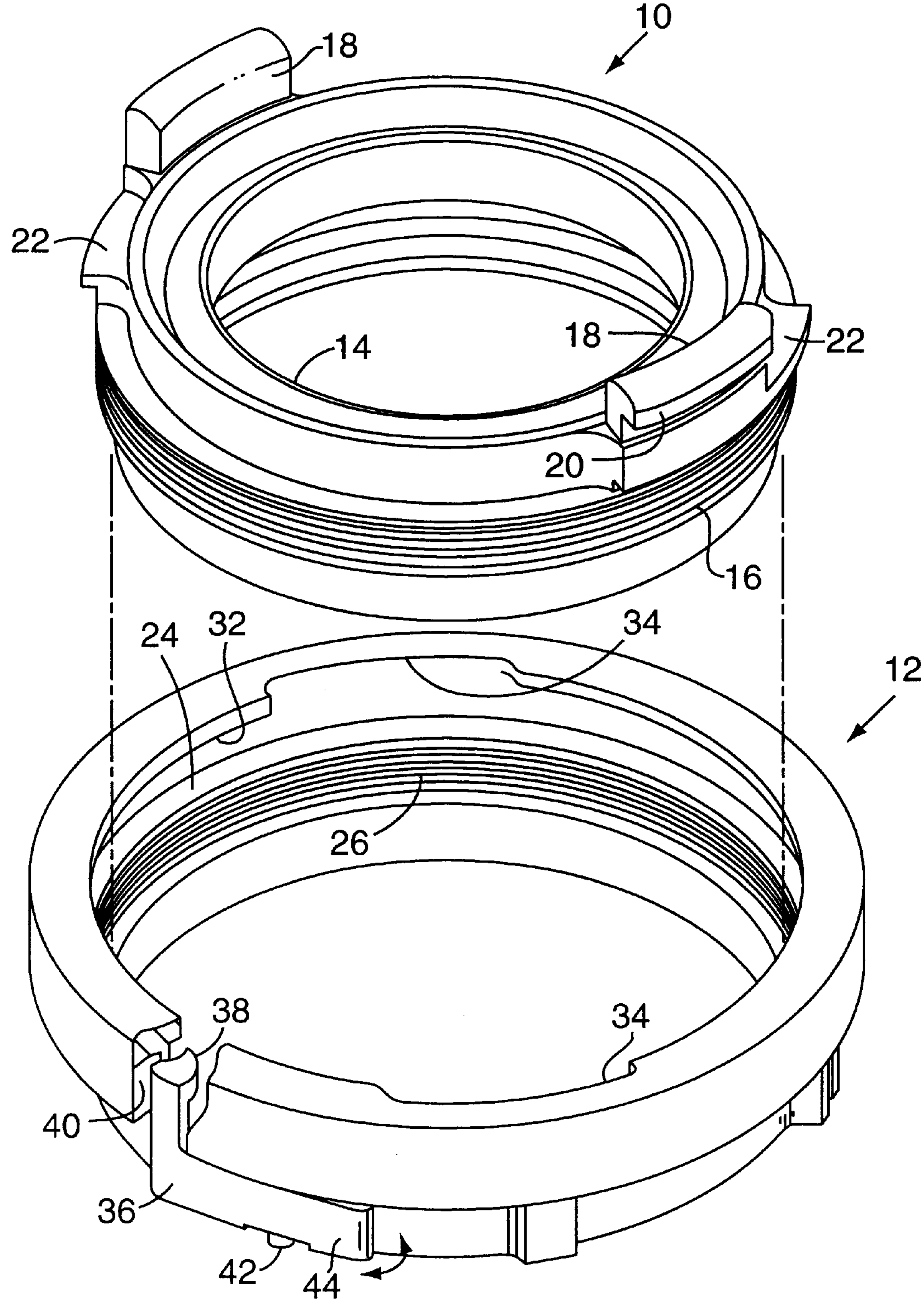
FIG. 1 is an exploded perspective view of an improved coupling unit of the multi-part type constructed in accordance with the present invention.

Referring particularly to FIG. 1, a coupling unit is illustrated in exploded perspective with an inner annular part indicated generally at 10 and outer annular part indicated generally at 12. The inner annular part 10 has a central opening 14 for the flow of liquid, gas or other fluid, powered and/or other media, and, the inner annular part is provided with external threads 16 over an axially extending portion adjacent its rear-end portion. At a front end portion the inner annular part 10 is provided with two or more circumaxially spaced, axially forwardly projecting lugs 18, 18. Each lug 18 has a radially outwardly projecting ear 20 at its free end portion. Further, each of the lugs 18 is provided at its base portion with a trailing flange 22. The flanges 22, 22 serve a purpose to be set forth hereinbelow.

The outer annular part 12 is also provided with a central through opening at 24 and with an internally threaded portion 26 which mates with the threaded portion 16 on the inner annular part when the two parts are assembled to form a coupling unit. Preferably, and as best illustrated in FIG. 2, and 3,a lock pin 27 or a set screw 28 may be provided in a suitable threaded opening 30 in the outer annular part 12 for engagement with the inner annular part 10 and for thus fixedly attaching the two parts in assembly as a coupling unit.

Figure 2:
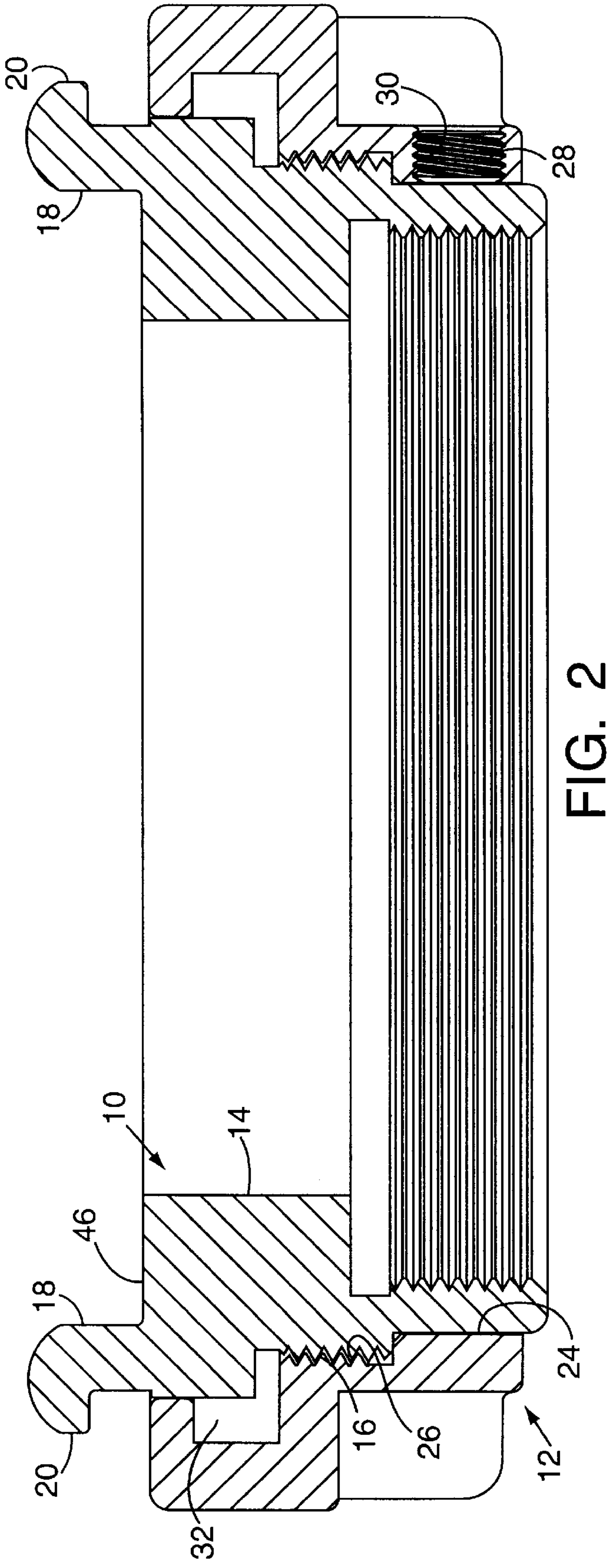
FIG. 2 is a vertical section through an assembled coupling unit constructed in accordance with the present invention and having a flat sealing surface and a female connection at a rear-end portion of its inner annular part.
Figure 3:
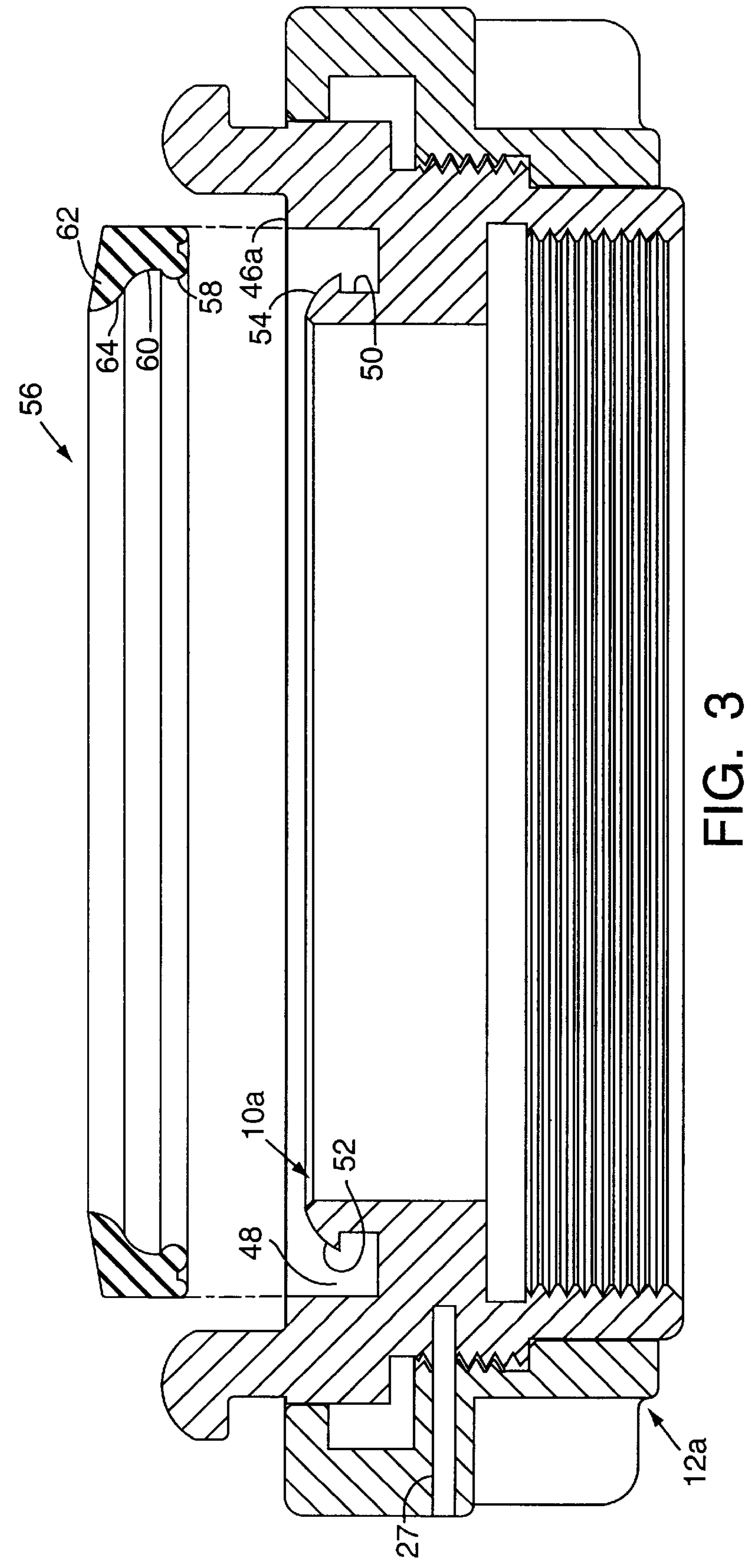
FIG. 3 is a vertical sectional view through an assembled coupling unit constructed in accordance with the present invention and having a female connection at a rear-end portion and a sealing groove for reception of a soft annular seal at a front-end portion.

Referring now to FIG. 1 and 2, it will be seen that a generally L-shaped groove 32 is provided at a diametrically enlarged portion of the outer annular part and is partially defined by the outer annular part and the assembled inner annual part. The groove opens axially forwardly and radially inwardly and communicates with a pair of similar circumaxially spaced notches 34, 34. The notches are defined in the diametrically enlarged front end portion of the outer annular part 12, communicate with the aforesaid annual groove as stated, and are located and dimensioned for the rear-ward axial entry of lugs such as 18, 18 on a complementary coupling unit. When the lugs have been axially entered into the L-shaped groove 32, relative rotation of the two coupling units may be effected to rotate the ears of the lugs along and through the groove and to secure the units together in assembled relationship.

In order to provide a positive stop for the lugs, the aforementioned trailer flanges 22, 22 are provided. That is, when the lugs have been entered in the notches 34, 34 and the groove 32 and rotated, for example, in a clockwise direction in FIG. 1 relative to the units 10 and 12, the lugs will engage the rear ends of the trailer flanges 22, 22, whereby, to provide positive stop action. Still referring to FIG. 1, and more particularly to the outer annular part 12, a stop 36 is preferably provided with an operative end portion 38 projecting through a slot 40 into the aforementioned L-shaped groove 32. The stop 36 is spring biased by a spring not shown to the position shown and is swingable about a pivot pin 42 outwardly on passage of a lug in clockwise movement along the groove 32. The position of the operative end portion 38 in the groove 32 is such as to permit the lug to reside between the trailer 22 with the stop portion 38 obstructing any counterclockwise movement of the lug and thereby positively preventing unintended disassembly of the coupling units. When it is desired to positively disassemble the units, a right hand end portion 44 of the stop 36 may be manually moved radially inwardly whereby to swing the operative stop portion 38 out of the groove and to allow an adjacent lug to be withdrawn in a counterclockwise direction in to alignment with the lower most notch 34 in the part 12.

Referring now more particularly to FIG. 2, it will be seen that the outer annular part 12 is shown in vertical section and in enlarged form therein. A radial flat 46 provided on the inner annular part 10 at a front-end portion thereof serves as a sealing surface and may for example engage a soft seal on a complementary coupling unit.

In FIG. 3, a coupling unit is shown with an inner annular part 10*a* and an outer annular part 12*a*. The parts 10*a* and 12*a* are substantially identical with the parts 10 and 12 described above except for the provision of an annular groove 48 in the flat surface 46*a* similar to the aforedescribed flat radial surface 46. The groove 48 extends rearwardly in the inner annular part 10 and has an inner or rearward portion 50 which is somewhat wider in the radial direction than a mid portion 52 of the groove. A rounded mouth portion 54 of the groove extends radially inwardly and forwardly from the mid portion 52 thereof.

A annular seal indicated generally at 56 has a cross sectional configuration similar to the cross sectional configuration of the groove 48 with a radially enlarged end portion 58, a mid portion 60 which is somewhat narrower radially, and a portion 62 forwardly of the mid portion 60, somewhat wider than the portion 60 and having a rounded transition 64 for co-operation with the rounded groove portion 54.

Figure 4:
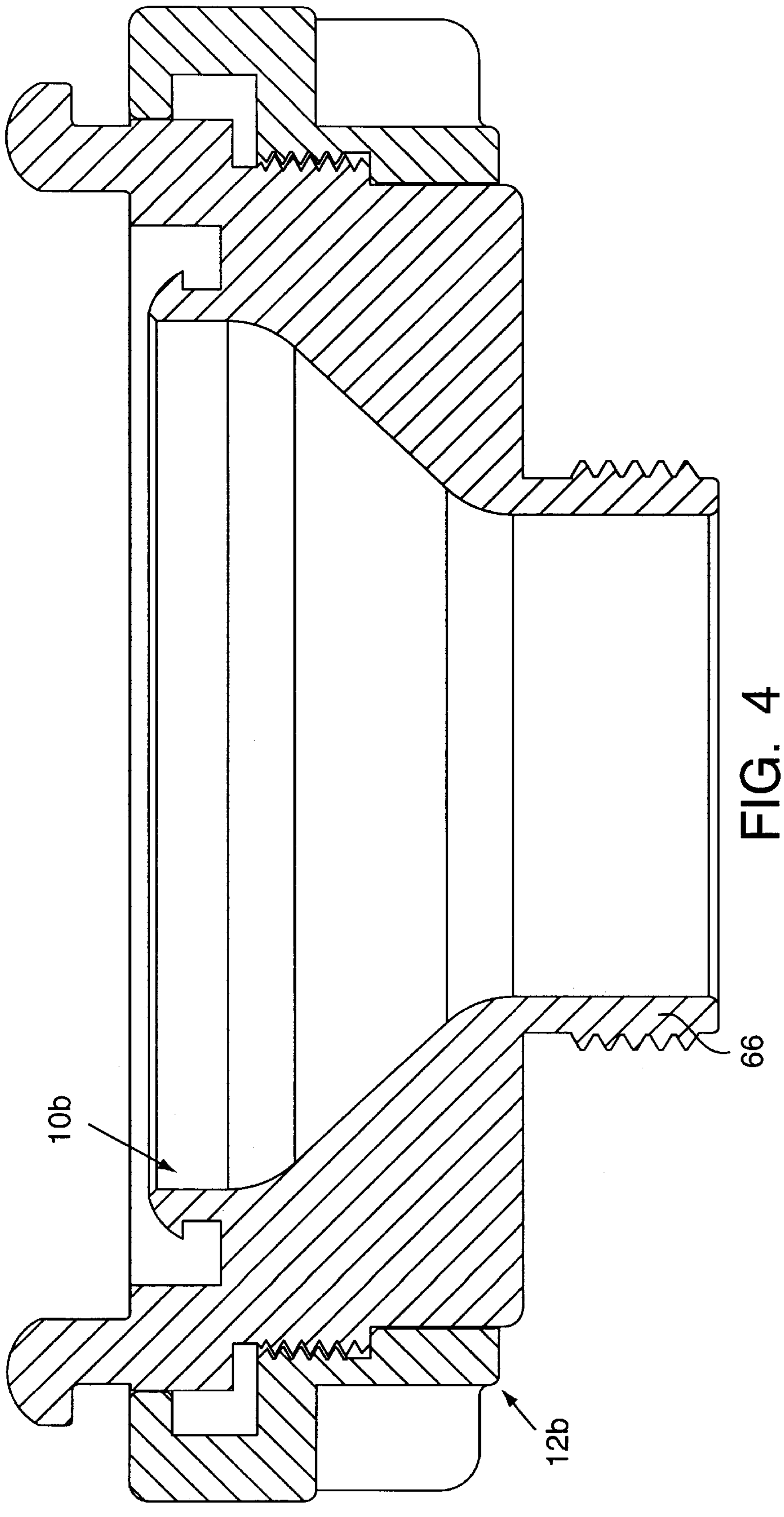
FIG. 4 is a further vertical sectional view of a coupling unit having a reduced diameter male threaded portion at a rear end thereof.

FIG. 4 illustrates a coupling unit having an inner annular part 10*b* which is similar to the aforementioned annular parts 10 and 10*a* except for the provision of a reduced diameter externally threaded male rear-end portion 66. An outer annular part 12*b* may be identical with the aforementioned parts 12 and 12*a*.

Figure 5:
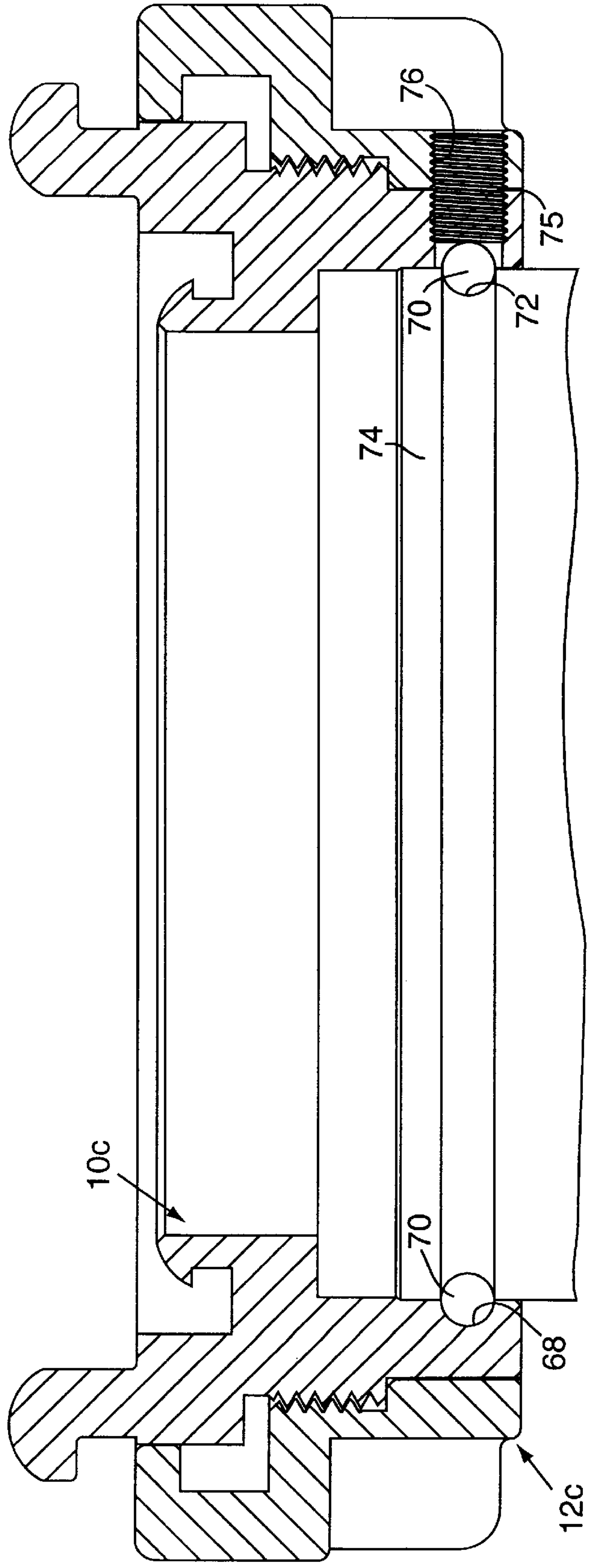
FIG. 5 is a vertical sectional view similar to the preceding views but showing a swivel-ball bearing connection at a rear-end portion of an inner annular part.

In FIG. 5, a coupling unit is provided with inner annular part 10*c* and outer annular part 12*c*. The inner annular part 10*c* is provided at a rear-end portion with a single internal annular groove adapted to receive a plurality of ball bearings 70, 70. The bearings are constrained within the groove 68 by a similar annular groove 72 in a connecting element 74. Thus, the parts 10*c*, 12*c*, and 74 are provided with a swivel connection resulting from free relative rotation between the annular part 10*c* and the element 74. Loading of the bearings 70 70 is provided for by means of a threaded opening 76 in the outer annular part 12*c*, set screw 75 closes the opening and captures the bearings on completion of loading of the bearings.

Figure 6:
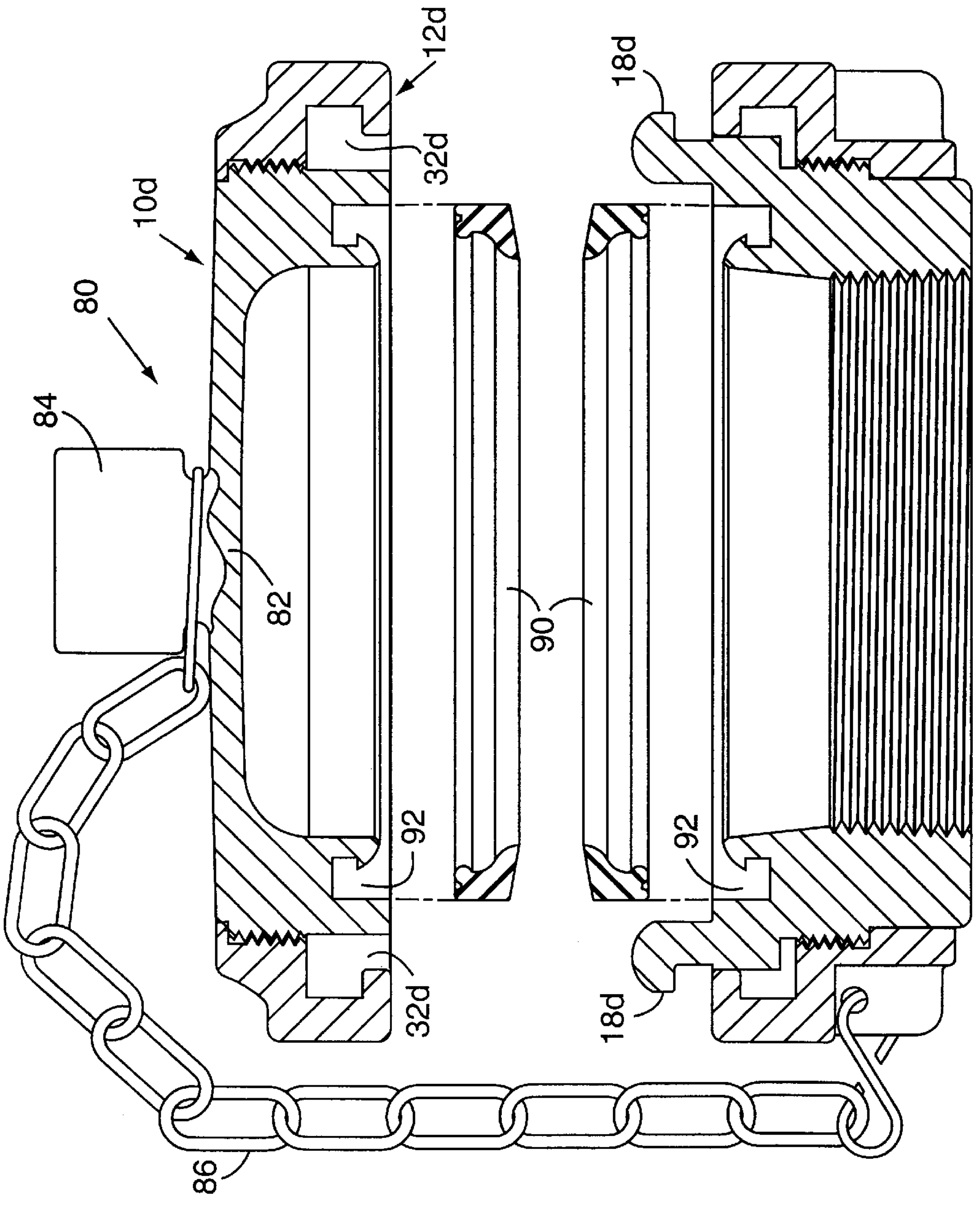
FIG. 6 is a vertical sectional view through upper and lower connectable coupling unit with the upper units serving as a closure member in a low pressure connection to a hydrant, etc.

In FIGS. 6 a low pressure closure assembly is illustrated and is usable for example on fire hydrants and the like. A closure member indicated generally at 80 has inner and outer annular parts 10*d* and 12*d*. Inner annular part 10*d* may be substantially identical with the above-described similar parts except for the provision of a radial extending closure portion 82 and a manual knob 84. The outer annular part 12*d* may also be substantially identical with these described above. There are no attachment lugs provided on the unit 80.

A connecting chain 86 extends from the knob 84 and is connected with a second coupling unit 88 which is or may be substantially identical with the coupling units of FIGS. 1 and 2. A pair of soft seals 90, 90 may be provided as illustrated for entry and retention in annular groves 92, 92 in the units 80, 88. Alternatively, a single seal 90 may be employed with a flat sealing surface on the adjacent coupling unit.

As will be apparent, the unit 80 may be removed rapidly from engagement with the unit 88 by limited relative rotation and disengagement of the lugs 18*d*, 18*d* from the groove 32*d*.

Figure 7:
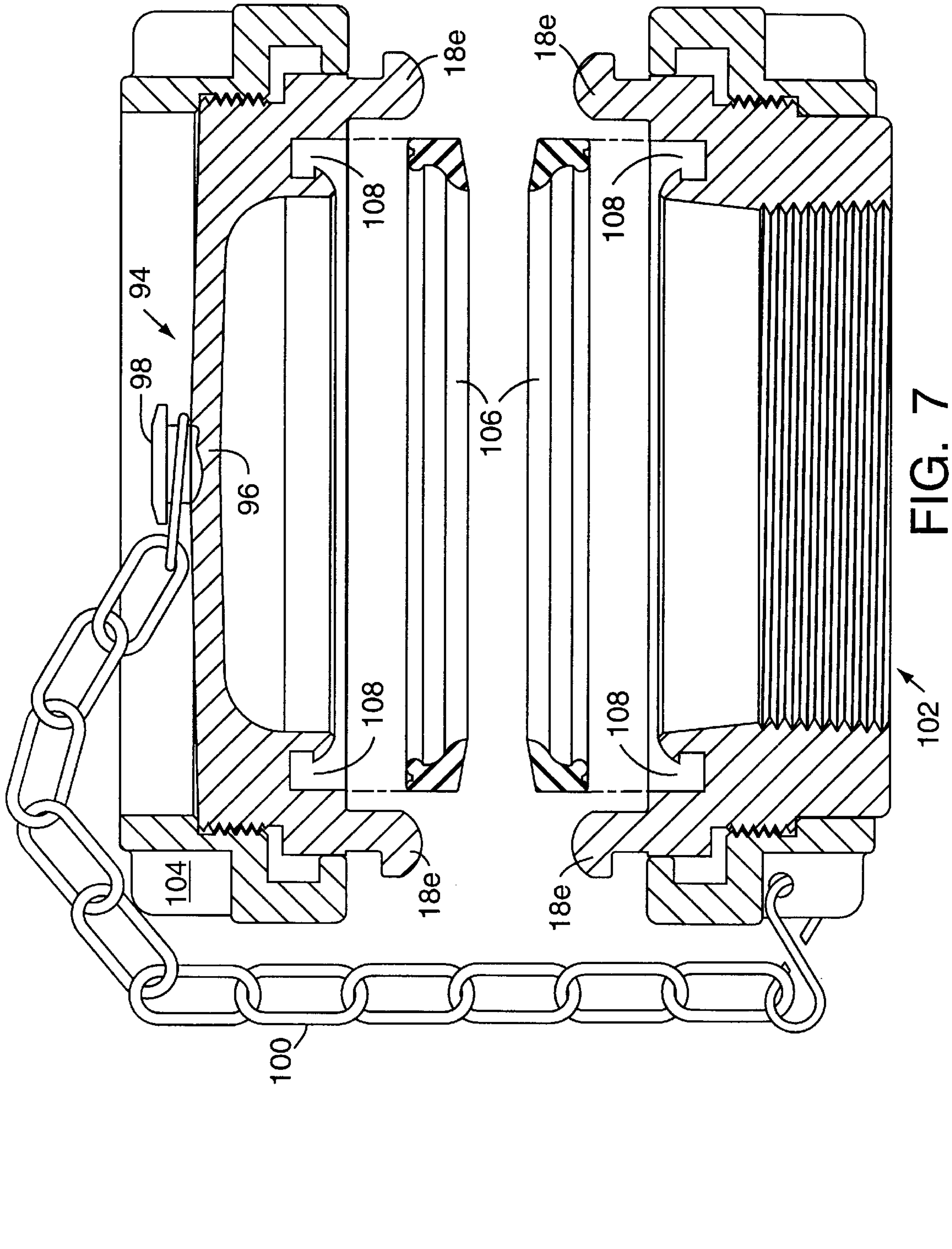

The assembly of FIG. 7 is similar to that of FIG. 6 with a coupling unit 94 provided with a closure portion 96 and a small knob 98 for connecting a chain 100 which extends to a second coupling unit 102. Circumaxially spaced lugs 104, 104 may be provided for assembly and disassembly of the unit 94 with the unit 102. The main difference between the FIG. 6 and FIG. 7 embodiments resides in the provision of circumxially spaced lugs 18*e*, 18*e* on the unit 94 in FIG. 7. That is, both coupling units 94 and 102 are provided with lugs in the FIG. 7 embodiments. Further, annular seals 106, 106 in FIG. 7 are preferably provided for both units 94 and 102 in order to insure high pressure operation of the units when assembled. The seals 106, 106 have cooperating annular grooves 108, 108 in the units 94 and 102.

As mentioned above, the parts of the multi-part coupling unit of the present invention may be of metallic machined construction as for example aluminum alloy parts machined from cylindrical aluminum extrusions. Further, molded thermoplastic construction is readily accommodated with the multi-part design of the present invention as are cast aluminum alloy manufacturing techniques.

In accordance with one method accommodated by the multi-part design of the present invention a plurality of substantially identical outer annular parts may be provided together with a second plurality of inner annular parts, the inner annular parts being divided into a number of groups of parts within said plurality of the parts and respectively having male, female, swivel, closure and other types of rear-end portions. In the course of manufacture, an outer annular part may be selected and combined with an inner annular part from any one of the foregoing groups of parts, thus, substantially reducing the necessary inventory of parts., In view of the foregoing, it will be apparent that the multi-part construction of the present invention can readily accommodate a number of different manufacturing techniques at economic advantage and at the same time provide a STORZ type coupling of superior characteristics.

What is claimed is:

1. A storz type coupling comprising a pair of similar and complementary coupling units each comprising assembled inner and outer annular parts with the former threaded externally over an axially extending portion thereof and the latter having mating internal threads over an axially extending portion thereof, the inner and outer annular parts being threadedly engaged at their mating portions with the parts assembled and fixedly attached together to form a coupling unit, each inner annular part having front and rear end portions with a pair of similar circumaxially spaced axially forwardly projecting lugs at its front end portion, and each lug having a radially outwardly projecting ear at its free end portion, each outer annular part having a front end portion adjacent and diametrically enlarged relative to its threaded portion and relative to the front end portion of an associated inner part, a radially inwardly open annular groove defined in said diametrically enlarged portion, and said front end portion of said outer annular part also defining a pair of similar circumaxially spaced axially forwardly open notches communicating with the annular groove and located and dimensioned for the rearward axial entry of the lugs on the complementary coupling unit there through and into the groove, relative rotation of the two coupling units on entry of the lugs and their ears into the groove serving to secure the units together in assembled relationship, wherein at least one lug on at least one inner annular part is provided with a small radial flange adjacent its rear end portion and which is located in an aforesaid groove when the inner and outer parts are assembled, said flange serving as a positive stop when engaged by a lug on a complementary coupling unit during the relative rotation of two coupling units as aforesaid.

2. A storz type coupling as set forth in claim 1 wherein the inner annular part of at least one of the coupling units includes an annular substantially flat radially extending forwardly exposed sealing surface defined at its front end portion and disposed radially inwardly of the lugs provided thereon.

3. A storz type coupling as set forth in claim 2 wherein the forwardly exposed substantially flat sealing surface on said inner annular part has a shallow forwardly exposed rearwardly extending annular sealing groove defined therein, and wherein an annular seal is provided and is disposed in the groove.

4. A storz type coupling as set forth in claim 1 wherein a small set screw and an associated small threaded radial opening are provided in at least one of the inner and outer annular parts to secure the parts against relative rotation when the parts are assembled.

5. A storz type coupling as set forth in claim 1 wherein said inner and outer annular parts are adhesively bonded together when the parts are assembled.

6. A storz type coupling as set forth in claim 1 wherein a latching device is provided and is operable to selectively project into and to allow a lug ear to rotate through said annular groove in one direction on assembly of two complementary coupling units and to engage and prevent rotation of the lug ear through the groove in an opposite direction whereby to prevent the unintended disassembly of the units, said latching device also being manually operable to allow passage of the lug in said opposite direction for the intentional disassembly of the units.

7. A storz type coupling as set forth in claim 1 wherein a rear end portion of at least one inner annular part comprises an internally threaded annular female connecting portion of the part.

8. A storz type coupling as set forth in claim 1 wherein a rear end portion of at least one inner annular part comprises an externally threaded annular male connecting portion of the part.

9. A storz type coupling as set forth in claim 1 wherein a rear end portion of at least one inner annular part forms a part of a swivel connector with an inwardly open annular groove provided therein and adapted to receive and accommodate relative rotation of at least one complementary connector element on a mating connector.

10. A storz type coupling as set forth in claim 9 wherein said inwardly open groove is shaped to receive a plurality of small bearings for rotation relative thereto.

11. A storz type coupling as set forth in claim 1 wherein a rear end portion of at least one inner annular part forms a closure for a through opening in said part.

12. A storz type coupling as set forth in claim 1 wherein said coupling parts are of machined metallic construction.

13. A storz type coupling as set forth in claim 1 wherein said coupling parts are machined from cylindrical blanks of an aluminum alloy.

14. A storz type coupling as set forth in claim 1 wherein said coupling parts are of molded thermoplastic construction.

15. A storz type coupling as set forth in claim 1 wherein said coupling parts are of cast aluminum alloy construction.

16. A storz type coupling comprising a pair of similar and complementary coupling units each comprising assembled inner and outer annular parts with the former threaded externally over an axially extending portion thereof and the latter having mating internal threads over an axially extending portion thereof, the inner and outer annular parts being threadedly engaged at their mating portions with the parts assembled and fixedly attached together to form a coupling unit, each inner annular part having front and rear end portions with a pair of similar circumaxially spaced axially forwardly projecting lugs at its front end portion, and each lug having a radially outwardly projecting ear at its free end portion, each outer annular part having a front end portion adjacent and diametrically enlarged relative to its threaded portion and relative to the front end portion of an associated inner part, a radially inwardly open annular groove defined in said diametrically enlarged portion, and said front end portion of said outer annular part also defining a pair of similar circumaxially spaced axially forwardly open notches communicating with the annular groove and located and dimensioned for the rearward axial entry of the lugs on the complementary coupling unit there through and into the groove, relative rotation of the two coupling units on entry of the lugs and their ears into the groove serving to secure the units together in assembled relationship, wherein a latching device is provided and is operable to selectively project into and to allow a lug ear to rotate through said annular groove in one direction on assembly of two complementary coupling units and to engage and prevent rotation of the lug ear through the groove in an opposite direction whereby to prevent the unintended disassembly of the units, said latching device also being manually operable to allow passage of the lug in said opposite direction for the intentional disassembly of the units.

17. A storz type coupling as set forth in claim 16 wherein a rear end portion of at least one inner annular part comprises an internally threaded annular female connecting portion of the part.

18. A storz type coupling as set forth in claim 16 wherein a rear end portion of at least one inner annular part comprises an externally threaded annular male connecting portion of the part.

19. A storz type coupling as set forth in claim 16 wherein a rear end portion of at least one inner annular part forms a part of a swivel connector with an inwardly open annular groove provided therein and adapted to receive and accommodate relative rotation of at least one complementary connector element on a mating connector.

20. A storz type coupling as set forth in claim 19 wherein said inwardly open groove is shaped to receive a plurality of small bearings for rotation relative thereto.

21. A storz type coupling as set forth in claim 16 wherein a rear end portion of at least one inner annular part forms a closure for a through opening in said part.

22. A storz type coupling as set forth in claim 16 wherein said coupling parts are of machined metallic construction.

23. A storz type coupling as set forth in claim 16 wherein said coupling parts are machined from cylindrical blanks of an aluminum alloy.

24. A storz type coupling as set forth in claim 16 wherein said coupling parts are of molded thermoplastic construction.

25. A storz type coupling as set forth in claim 16 wherein said coupling parts are of cast aluminum alloy construction.

* * * * *